United States Patent [19]
Delroy

[11] Patent Number: 5,090,260
[45] Date of Patent: Feb. 25, 1992

[54] GYROSTAT PROPULSION SYSTEM

[76] Inventor: Mortimer S. Delroy, P.O. Box 207, R.R. #2, Nepean, Ontario, Canada, K2C 3H1

[21] Appl. No.: 563,081

[22] Filed: Aug. 6, 1990

[30] Foreign Application Priority Data

Aug. 9, 1989 [CA] Canada ................................. 607,921

[51] Int. Cl.⁵ ....................... G01C 19/00; F16H 27/04
[52] U.S. Cl. ........................................ 74/5.37; 74/84 S
[58] Field of Search ................... 74/5.34, 5.37, 84 S

[56] References Cited
FOREIGN PATENT DOCUMENTS 2825490 12/1979 Fed. Rep. of Germany ....... 74/5.34
2293608 7/1976 France ................................ 74/5.34
0056182 4/1985 Japan ................................. 74/84 S Primary Examiner—Rodney H. Bonck
Attorney, Agent, or Firm—Pascal & Associates

[57] ABSTRACT

A thrust producing apparatus comprising a gyrostat having a gyrostat wheel, apparatus for supporting the gyrostat, apparatus for toppling the gyrostat creating precessional force in a predetermined direction against the supporting apparatus, and apparatus for rotating the gyrostat into an orientation whereby it can again be toppled while avoiding the creation of precessional force in a direction opposite to the predetermined direction. Controlled unidirectional movement of the apparatus based on gyrostatic precession is thereby obtained.

23 Claims, 6 Drawing Sheets

GYROSTAT PROPULSION SYSTEM

FIELD OF THE INVENTION

This invention relates to an apparatus for creating thrust in a desired direction from rotary motion.

BACKGROUND OF THE INVENTION

Various designs have been proposed throughout the years for translating rotary motion to linear motion. Other than a common crank mechanism, most designs used structures for varying the location of masses from a center of rotation, to create changing moments of inertia. Such structures suffered from erratic and jerky motion, and the requirement for reciprocating members to be used. Attempts to increase the linear motion ultimately required increases in reciprocal thrust lengths, or larger masses, or both, resulting in very difficult mechanical constraints to overcome. In addition, such structures do not appear to be capable of self-sustained lift.

The present invention is a structure which produces unidirectional force using gyrostats (gyroscope wheels henceforth referred to as gyros) which produces linear motion in a manner which requires no outwardly thrown inertia members, and in its most efficient design produces unidirectional motion in any of the three spacial directions or their resultant. The design thus appears to be able to produce self-supporting lift with respect to its own frame of reference. While the invention may initially appear to defy Newton's third law of motion, it will be shown below that this does not occur.

To understand the concepts behind the invention, consider first a traditional toy gyroscope. It has been well demonstrated that a spinning gyroscope can be supported at the tip of one end of an axis intersecting its spin axis, and the other end will hang in space without support, even when pulled by gravity. The property of gyroscopic inertia is that the direction of the spin axis resists change, including that caused by the force of gravity. For that reason, a gyroscope mounted universally, in double gimbals, will maintain precisely the same orientation in space no matter in which direction its support is turned. However if a force alters the direction of the spin axis, the gyroscope will turn about an axis at right angles to the force for as long as the force is applied. This movement is known as precession. The present invention depends on this property, and uses the precessional force to create linear motion.

Turning to FIG. 1, a three dimensional spacial frame is shown, having mutually orthogonal X, Y and Z axes. A gyro wheel 1 is rotating about an axis A-B, which is parallel to the X axis. The Z axis intersects the plane of the wheel and the A-B axis. Assume that the wheel 1 is spinning in the counterclockwise direction, when one faces from the right hand side into the Y-Z plane. The direction of rotation is shown by the arrow 2. With the wheel spinning, this is the counterpart or equivalent of a gyro, which can be supported at the end of the axis A, and the other end B will remain in position, assuming sufficient rotational velocity and mass at the periphery of the wheel.

Now assume that the axis Z, carrying with it the wheel and axis A-B, is rotated counterclockwise about the axis Y shown, as shown by reference numeral 3, when looking from the left into the plane X-Z. It may be seen that the axis A-B of wheel 1 is carried around the axis Y, and the direction of the spin axis of wheel 1 is changed. The causes a precessional force. Assuming that the axis A-B is supported on axis Z, the precessional force will be at right angles to the force causing the alteration of the direction of axis A-B, and is in the direction shown by arrow F, that is, will tend to produce a force in the X direction through the Z-X intersection or more accurately, through the center of gravity of the structure. It will be assumed that there is a counterweight on the opposite side of the X, Y, Z intersection, and the center of gravity is at that intersection.

On the other hand, if, instead of the Z axis rotating around the Y axis, the Y axis is stable and the Z axis rotated about the X axis, the direction of the spin axis A-B would not change; it would remain parallel to its original position, and no precessional force F would be produced.

A schematic drawing illustrating an embodiment to explain the principles of the present invention is shown in FIG. 2. A three dimensional frame of reference having axes X, Y and Z is shown which is similar to the one in FIG. 1. The gyro wheel at position 1A corresponds to gyro wheel 1 in FIG. 1. In the position shown where the Z axis intersects its plane, the wheel rotates about axis A-B which latter axis is parallel to axis X. The gyro wheel at position 1A is rotating in the counter clockwise direction looking from the right hand side into the plane Y-Z.

Now the axis A-B is rotated (tilted or toppled) counterclockwise looking from the left into the plane X-Z, about the Y axis in the direction 3. Precessional force which is theoretically exactly equal to the A-B axis tilting force acts in the direction F through the Z-X intersection as described with reference to FIG. 1. A torque effect is created whose axis is at right angles to the X-Z plane. This torque causes a twisting motion in the X-Z plane, which exerts a leverage acting through the center of gravity of the machine on which the gyro is mounted.

To visualize the effect, consider a toy fast spinning gyroscope having a horizontal axis and supported at one end. A force from below pushing the supported end upwardly will cause sudden precession of the axis of the spinning gyroscope in a direction at right angles to the upward force, that is, in the horizontal plane. If one would measure the precessional force at the other end of the axis which is unsupported, one would find that, neglecting friction, the precessional force is identical to the lifting, or gyro toppling force. Yet is important to realize that there is no reaction in the opposite direction to the precession, in apparent contradiction to Newton's third law of motion. While this phenomenon has been known for a long time, a description of a theory as to why this precession occurs with no apparent counterreaction may be found in the article "Anti-Gravity Electronics", by Dr. H. Aspden, Department of Electrical Engineering, University of Southhampton, found in *Electronics and Wireless World*, January 1989, pp. 29-31.

In FIG. 2 the wheel at position 1B is the same gyro wheel, but is now located with its A-B axis in the X-Y plane, spinning in a counterclockwise direction when looking from the left to the plane X-Z. The axis A-B intersects the X axis orthogonally.

As the Y axis rotates, rotating the A-B axis around it, it may be seen that the gyro is not toppled; the spin axis direction is not altered, and remains parallel to the Y axis.

In the third position 1C, the gyro wheel, which again is the same gyro wheel as before, has its A-B axis parallel to the X axis, is below the Y axis, and the Z axis intersects its plane. In this case, the direction of the A-B axis is exactly the same as that of gyro wheel at position 1A. However, the gyro wheel is spinning clockwise, when one looks from the right towards the Y-Z plane. Now as the Z axis rotates about the Y axis carrying the gyro wheel the direction of the spin axis A-B changes, the gyro wheel is toppled, and a precessional force is created. In this case since the direction of the A-B axis is the same as that of wheel at 1A, and since the spin axis of the gyro wheel is in the exactly opposite direction, due to the position and toppling direction of the gyro, the force due to the torque causes a leverage through the center of gravity of the machine, and there is a force in the X axis direction which is similar to that of the force caused by toppling of the gyro wheel 1A, and is referenced F1.

In the fourth position, the gyro wheel at position 1D rotates about its A-B axis which intersects the X axis orthogonally. The gyro wheel rotates in the clockwise direction looking from the left into the X-Z plane. Now with the A-B axis parallel to the Y axis and rotating counterclockwise around the Y axis, there is no toppling of the gyro, and no net force along the X axis is created.

It may be seen that with rotation of the gyro wheel about its own A-B axis, the rotation of that axis continuously through 360° while the entire gyro is being rotated around the Y axis, the positions of the gyro wheel can move through the positions shown in FIG. 2 as 1A, 1B, 1C and 1D, and results in a net force in the X direction. In a sense one may consider this as full wave rectification of the precessional force caused by the gyro toppling force, into a linear force acting through the center of gravity of the machine.

It should be noted that the precessional force is, neglecting friction or other losses, equal to the toppling force. Thus if a toppling force is produced by rotary motion, as in the present invention, it is merely the force of that rotary motion that will control the linear force acting on the machine.

In the preferred form of the invention a second gyrostat, toppled in the same manner as the first, is located physically 180° opposite to the first, for balancing purposes and to increase the force on the machine. Such structures can be ganged and produce a motor having toppling gyroscopes around the periphery of a circle, creating an enormous unidirectional force on the machine, with no reaction required on a supporting medium such as a road to create movement.

DESCRIPTION OF THE PRIOR ART

Before describing the preferred embodiment of the present invention, an invention described in U.S. Pat. No. 3,653,269 to Foster will be considered below. While the structure described with reference to FIGS. 6 and 7 in that patent relates to inertial thrust apparatus which is an entirely different concept from the present invention, the structure described with reference to FIGS. 1-5 contains some concepts which could include toppling of a gyro.

In the Foster patent a large flywheel 20 rotates and contains a pair of rotating inertia wheels 31, each with its axis being rotated about a spindle 35 as the flywheel 20 rotates, each thus forming a gyro. The gyro is rotated through 360° during only a 90° rotational period of the flywheel 20. This causes first a forward then a backward force on the machine, which would cause a rocking (and thus cancelling) motion. Foster states that a backward force is produced by noting that the backward force is absorbed by the inertia of the member 20 (column 4, lines 30-34). Of course, the forward force must also be absorbed by the same member. Spinning of the gyro around spindle 35 is in the wrong direction to create forward thrust, and indeed causes backward thrust, which is evident when one compares the precessional forces at $22\frac{1}{2}°$ and $337\frac{1}{2}°$ in FIG. 4, which are in opposite direction to each other.

In column 4, lines 1-9 it is stated that the inertia member (31) makes two complete revolutions about its longitudinal axis during the time that the wheel (the flywheel 20) makes one-half a revolution about its axis. Thus it appears that what causes forward motion in the Foster invention due to any gyro precessional effect is that the orientation and/or position of the gyro as the disk rotates varies, causing the forward and backward precessional forces to be unequal, causing movement of the vehicle in one direction. The rotation of the axes of the gyros is stopped during 180° of rotation of the flywheel 20, the rotation motor being disconnected during that one-half of the cycle of the flywheel, apparently in order to stop precessional forces. Yet in the other half of the cycle the inertia members are rotated continuously, as many as five times during a 180° rotational interval of the flywheel 20 (see column 7, lines 26-18). Due to the continuous rotation of the Foster inertia members during one-half of a cycle, it is clear that the Foster structure continuously reverses the direction of precessional force on the main structure during 180° rotation of the flywheel, except for the portion caused by any incomplete portions of a 360° turn of the rotation of the gyro about its spindle 35, and provides no precessional force during the second 180° portion of the cycle.

Further, from a consideration of FIG. 4, it appears that the axis of the inertia member is parallel to the main rotational axis of the main flywheel at the top (at 0°). Thus the rotation of the main flywheel 20 at that instant mainly moves the axis of rotation of the inertia member parallel to its axis of rotation, and no toppling occurs, and thus no precessional force is created. At other rotational positions of the inertia member (eg. $22\frac{1}{2}$ and $337\frac{1}{2}°$) toppling occurs, but causing precessional forces in opposite and therefore cancelling directions. Again at 45° and 315° there is no toppling occurring and thus no precessional forces created.

Foster states that in effect it is the inertia effect, rather than precession, which causes his invention to work. In column 3, lines 1-32, and particularly at lines 8-10, it is noted that it is the movement of the masses faster in the direction of travel than in the opposite direction that causes unidirectional movement. This corresponds to the principle of his invention in the embodiment of FIGS. 6 and 7.

More to the point, since it is the movement of masses that clearly cause the Foster invention to work, the Foster invention uses an inertia wheel, which is solid and has its moment of inertia well toward its axis from the periphery, in contrast to a gyro wheel as used in the present invention which, as is well known, has its moment of inertia as close to its periphery as possible, and contains little mass inward of the periphery.

It is therefore believed clear that if the Foster structure obtains unidirectional thrust in some way related to the harnessing of precessional forces, it is not the primarily desired form of thrust, the structure inherently creates a cancelling precessional force, has a resultant unidirectional force only over a very small rotational angle of a 180° segment of the 360° rotation of the main flywheel (the remaining 180° segment creating no precessional thrust at all), and is mainly caused by an accidently created difference between the forward and cancelling reverse unidirectional precessional forces created in the machine.

On the other hand, in applicant's invention, when considering linear movement in the forward X axis direction, there is substantially no precessional force cancellation at all.

The present invention does not depend on the inertia effect of a massive wheel spinning in the direction of movement of travel, as in Foster. It has also been found that the location of the axis of rotation of the gyrostat wheels relative to the center of gravity of the machine is an important optimizing condition, and very significantly optomizes the amount of thrust achieved.

SUMMARY OF THE INVENTION

An embodiment of the present invention is a thrust producing apparatus comprising a gyrostat having a gyrostat wheel, apparatus for supporting the gyrostat, apparatus for toppling the gyrostat creating precessional force in a predetermined direction against the supporting apparatus, and apparatus for rotating the gyrostat into an orientation whereby it can again be toppled while avoiding the creation of precessional force in a direction opposite to the predetermined direction.

Another embodiment of the invention is a thrust producing apparatus comprising a gyrostat having a gyrostat wheel for rotation about a rotational axis, a principal axis of the apparatus, apparatus for supporting the gyrostat a distance perpendicular to the axis whereby the plane of the rotational axis is tangent to a circle centered on the principal axis, apparatus for rotating the gyrostat about the principal axis while rotating the rotational axis about 360° in the plane while rotating the support 360° about the principal axis, whereby precessional thrust is created in a direction orthogonal to the principal axis.

BRIEF INTRODUCTION TO THE DRAWINGS

A preferred and other embodiments of the invention will be described by reference to the detailed description below, with reference to the following drawings, in which:

FIG. 1 is a schematic diagram used to illustrate the principles on which the invention is based, FIG. 2 is a schematic diagram used to illustrate operation of the invention, FIG. 3 is a perspective diagram of an embodiment of the invention, FIG. 3A is a cross-section through a differential used in a successful prototype of the invention, FIG. 4 is a graph illustrating force over a cycle obtained in the present invention, FIGS. 5A, 5B and 5C are graphs of output force VS angle of topple of a gyrostat, FIGS. 6A and 6B is a graph and an expanded portion of a graph respectively of output force VS distance of the rotational axis of a gyrostat from the center of gravity of the apparatus, FIG. 7 is a schematic diagram showing a ganged embodiment of the invention, and FIG. 8 is a schematic diagram showing another embodiment of the invention.

DETAILED DESCRIPTION OF THE INVENTION

Figure 2:
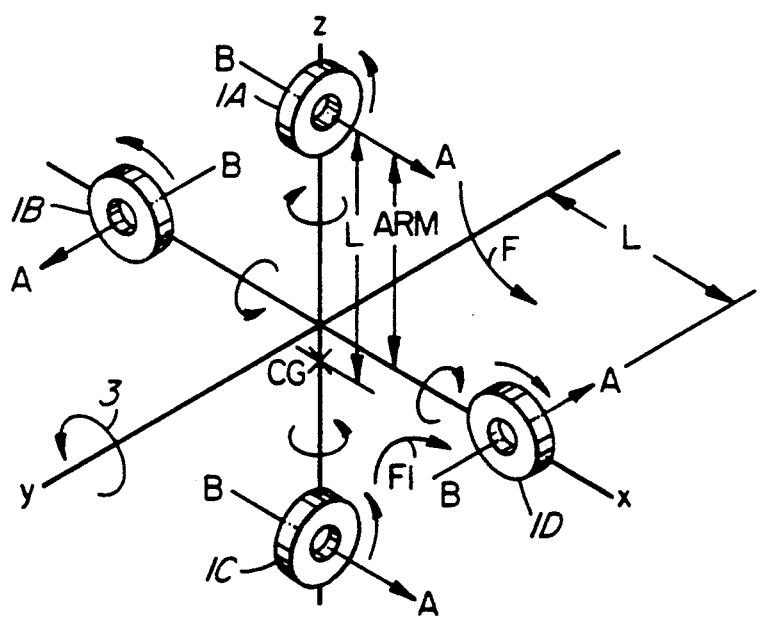
Figure 3:
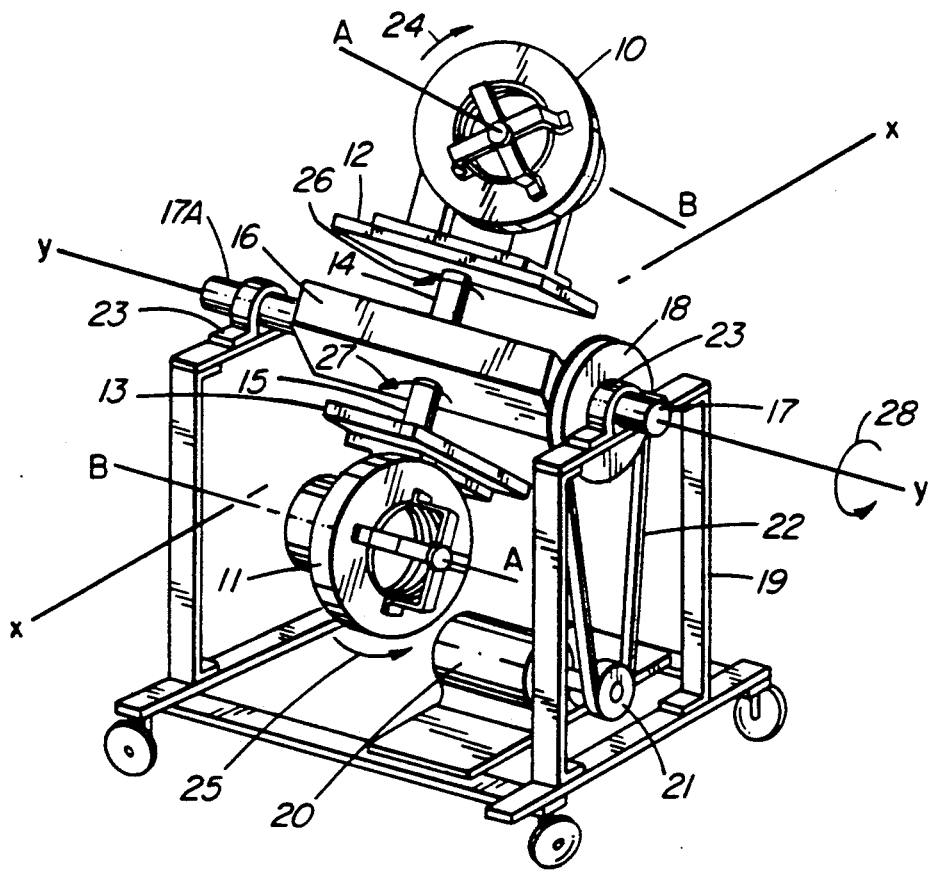

Turning now to FIG. 3, the basic structure of a working laboratory prototype is shown. It would be useful to consider the structure of FIGS. 3 and 3A in conjunction with FIG. 2.

Figure 3A:
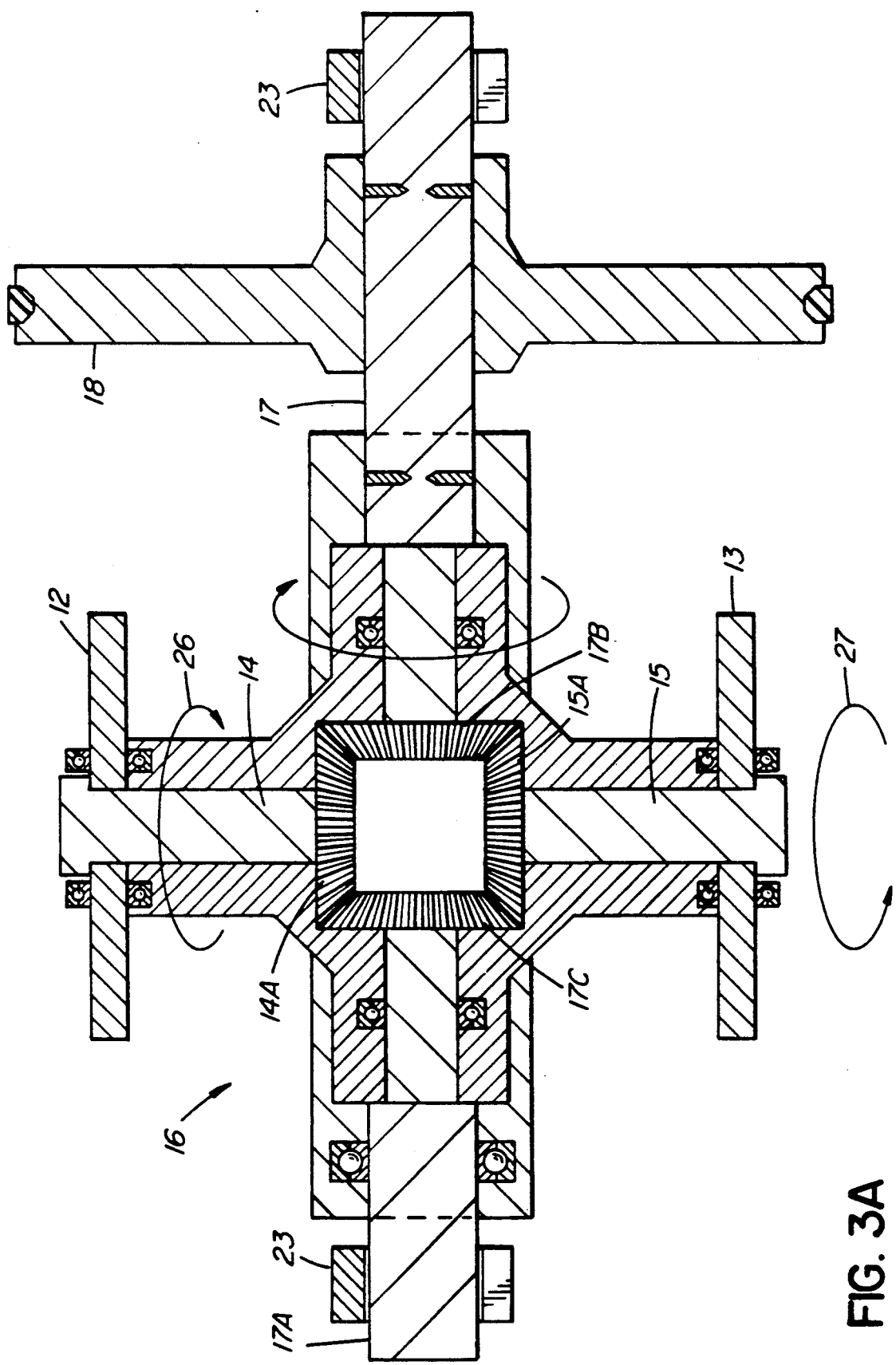

Gyros 10 and 11 are each firmly mounted to corresponding platforms 12 and 13. Each platform is fixed to the end of a corresponding axel 14 and 15 located on the same axis. The other end of each of the axels 14 and 15 is connected to a differential gear mechanism 16, having a main input shaft 17 and a fixed shaft 17A. A frame 19 supports the input shaft 17 and also supports a motor 20. A section through the differential is shown in FIG. 3A.

A pulley 18 is fixed to the input shaft 17. Input shaft 17 is held to the frame 19 by means of bearings 23. Another pulley 21 is fixed to the output shaft of motor 20, and a v-belt 22 connects the two pulleys. Shaft 17A is fixed, e.g. pinned so that it cannot rotate, to the frame. The ends of the shafts 14, 15, 17 and 17A are coupled by means of bevelled gears 14A, 15A, 17B and 17C fixed to the shafts. The housing surrounding differential 16 in which shafts 14 and 15 rotate is locked or pinned to shaft 17.

When motor 20 rotates, pulley 18 rotates with it due to the coupling of v-belt 22, and causing rotation of shaft 17. This causes rotation of axels 14 and 15 around the Y axis of shaft 17 in the direction 28, and rotation of axels 14 and 15 about their own axes in opposite directions 26 and 27. This causes rotation of the platforms 12 and 13 around the axis Y of shaft 17, and rotation of the gyros 10 and 11 in opposite directions around the axis of axels 14 and 15.

The tooth ratios of the gears within differential 16 should be such that the axes A-B (which corresponds to the axes A-B in FIG. 2) of the gyro wheels of the gyros 10 and 11 should turn through 90° during a 90° rotation of pulley 18 and thus of differential housing 16. The orientation of the gyros should be such that at about top dead center, the rotation axis A-B of each gyro wheel should be about parallel to the X axis, that is, the axis along which the linear movement force is to be produced. The direction of rotation of the gyro wheels, however, should be as shown in FIG. 2 (at 1A and 1C), which will occur if the platform is rotated as described herein. This will produce identical rotational direction of both gyros at top dead center.

The direction of the X axis may of course be arbitrarily chosen. In this regard rudimentary steering can be achieved by rotation of the A-B axis of the two gyros so that the position of maximum precession caused by the toppling force is rotated. As will be explained later, it has also been found that by controlling the length of the arms supporting the gyros, the direction of force can be reversed.

Consider the structure of FIGS. 3 and 3A with reference to FIG. 2 (the X-Y axis of the structure of FIG. 3 being drawn rotated 90° from FIG. 2, and the entire mechanism being shown with the gyros at an angle to top dead and bottom dead center). It will be noted that at the top dead center the axis A-B of gyro 10 should be at about parallel to the X axis and the wheel rotates e.g. in the direction 24. The housing 16, supporting axels 14 and 15, and platforms 12 and 13 rotate about the axis Y in the direction 28 due to operation of motor 20, pulleys 21 and 18 and the v-belt 22.

Similarly at that point the rotational axis A-B of gyro 11 (at bottom dead center) should also be about parallel to the X axis, but the direction of rotation 25 of the wheel of gyro 11 is reversed from that of gyro 10 for the reason to be described below. At these positions, as the platforms 12 and 13 rotate about the Y axis (shaft 17) carrying the gyros with them, there is maximum toppling force on the two gyros, i.e., there is maximum alteration of the direction of the spin axis of each of the gyros. The result is maximum precessional force caused by both gyros, each causing torque on its support, acting through the axels 14 and 15, to the center of gravity of the apparatus and in the X axis direction.

Should the direction of rotation of the gyro wheels or the direction of rotation of the pulley be reversed, the direction of force will reverse.

As the mechanism rotates about the Y axis, the axels 14 and 15 rotate in opposite directions 26 and 27 as shown. This corresponds to the rotation of the axis A-B in FIG. 2 through 90° to the position shown with the wheel moved from position 1A to position 1B, i.e. from intersection with the Z axis to intersection with the X axis, rotating counter-clockwise when viewed from the left into the X-Z plane. In this position the gyros 10 and 11 will have their wheel rotational A-B axes perpendicular to the X axis and parallel to the Y axis. As pulley 18 rotates, further rotating the platform on which the gyros are fixed, at this position orthogonal to top and bottom dead center, there is no toppling of the gyros, since the axes of rotation A-B the gyro wheels are being moved parallel to the axis of rotation of the gyros themselves (about the axis Y, shaft 17).

As the pulley 18 continues to rotate, eg. in the direction 28, gyro 10 will pass through bottom dead center and gyro 11 through top dead center. For gyro 10 this corresponds to the position of wheel position 1C in FIG. 2, with the A-B axis in the same direction as wheel position 1A, and as the platforms on which the gyros are supported rotate in the directions shown, there is maximum toppling force on the gyro, maximum precession, and maximum torque and linear force created in the X direction. The function of gyro 11 will be identical to that of gyro 10 in its top dead center position.

As the differential 16 and therefore platforms 12 and 13 rotate through the next 90°, the gyro axes A-B rotate again through 90°, and gyro 10 establishes the position of wheel 1D in FIG. 2; the position of gyro 11 will be in the position of wheel 1B of FIG. 2. Since the axes A-B of the two gyros now are parallel to axis Y, as the platforms are rotated there will be no toppling and thus no precessional force created.

Figure 4:
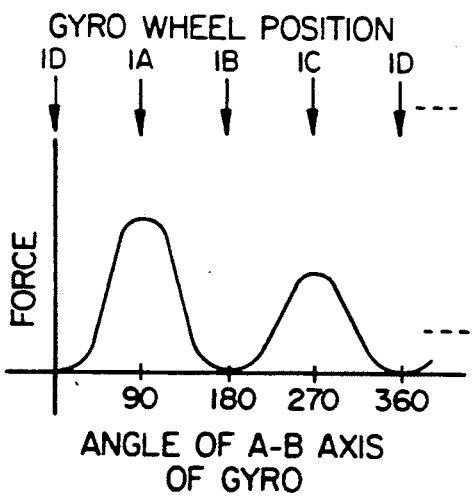

FIG. 4 illustrates a linear precessionally caused force VS rotational angle curve for either of the gyros 10 or 11. Considering the X axis of the X-Z plane as 0°, it may be seen that no force is created with the gyro axis A-B is parallel to the Y axis, i.e. in position 1D of FIG. 2. As the housing 16 rotates through 90°, the precessional and therefore linear force on the machine increases to a maximum, then decreases to a minimum at 180°. As the gyro rotates to position 1C in FIG. 2, again a peak in precessional and therefore unidirectional force is created. It has been found that the peak force is less at the 270° position than at the 90° position for a single gyro, possibly because the center of gravity of the machine is below the X,Y,Z axis, and thus the distance between the A-B axis and the center of gravity is less below the y axis than above.

Figure 5A:
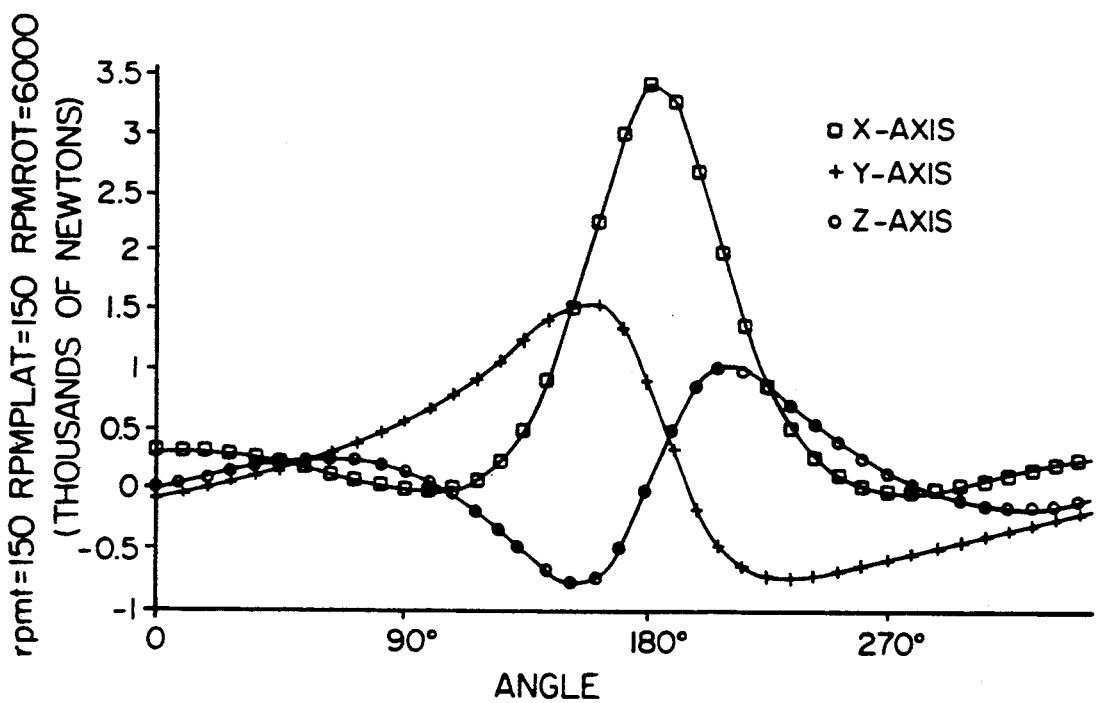

FIG. 5A is a computer calculated graph of output force for a single gyro in thousands of newtons along the X, Y and Z axes for various angles of maximum topple (neglecting the return swing). The angle of maximum topple is the angle from an axis parallel to the X axis at which the A-B axis is perpendicular to the Y axis. In the calculation the gyro platform was considered to be rotated at 150 rpm, the gyro was considered to be rotating at 6000 rpm, the gyro wheel weight was 3.2 kilograms and had a radius of 7.62 cm, and the length L, that is the distance between the axis A-B of the gyro wheel and the center of gravity of the machine was 25 cm. It may be seen from the graph that if the (maximum) angle of topple is 180°, there is a maximum in the toppling and thus precessional (and linear) force along the X axis, and two smaller and relatively insignificant peaks in precessional forces along the Y and Z axes preceding and following the peak in the X axis.

Figure 5B:
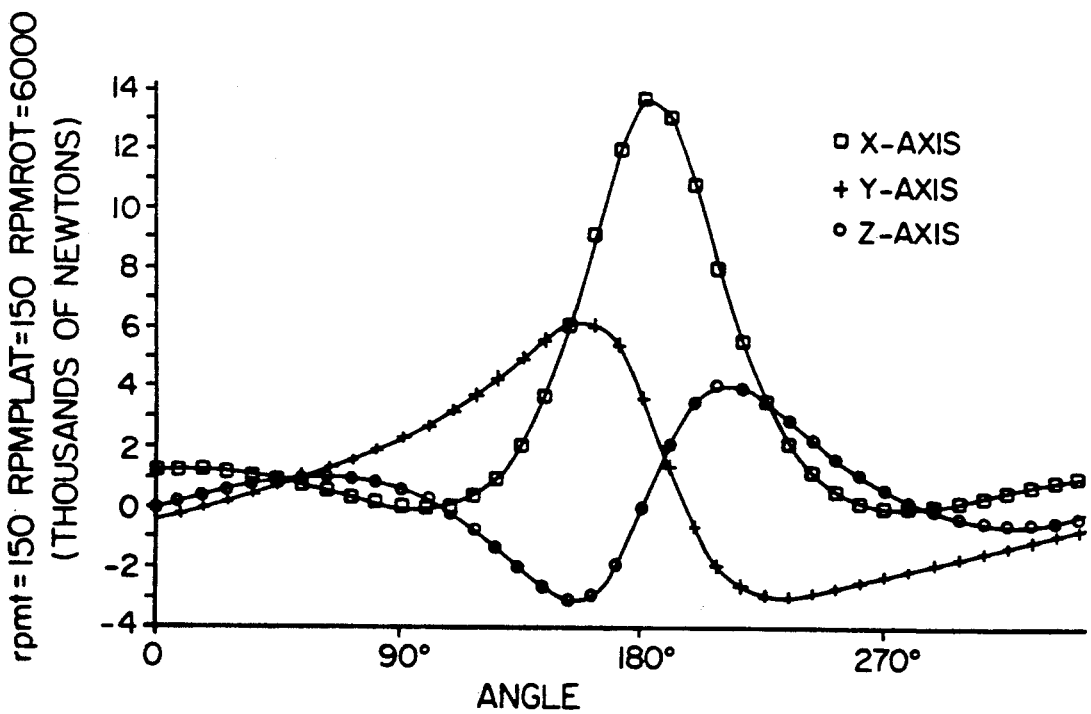

FIG. 5B is a similar graph with all parameters the same as the structure resulting in FIG. 5A, but in which the radius of the gyro wheel is 15.24 cm rather than 7.62 cm. The resultant force in the X direction is quadrupuled, from about 3.4 thousand newtons in FIG. 5A to about 13.6 thousand newtons in the case of FIG. 5B.

Figure 5C:
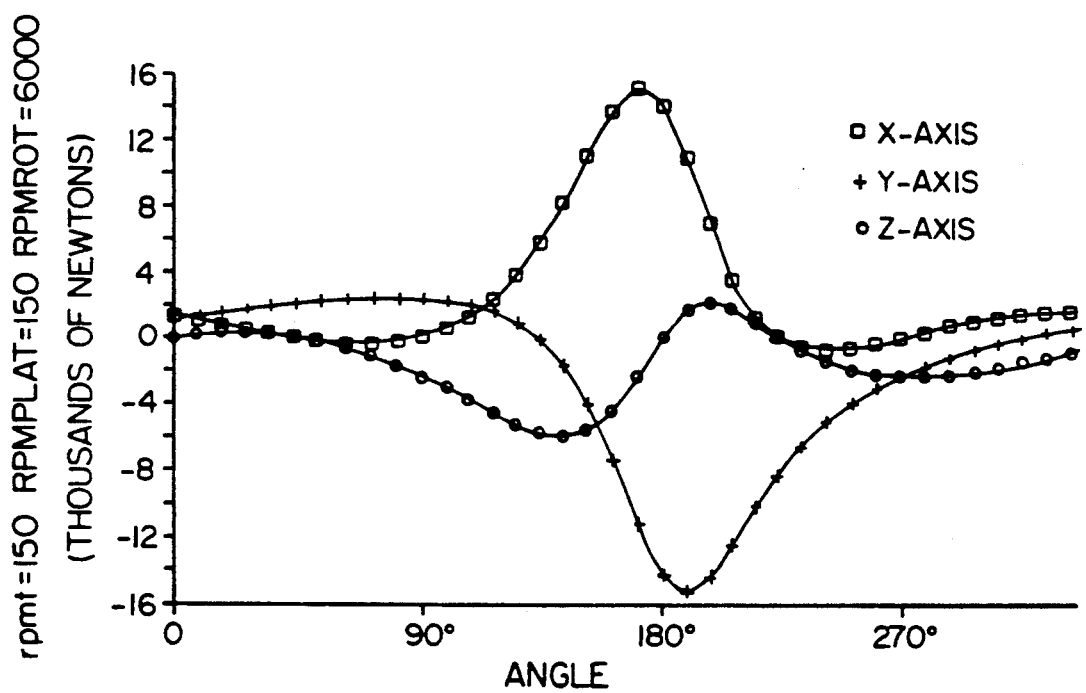

FIG. 5C is a graph resulting from a machine with parameters which resulted in graph FIG. 5B, but with the angle of maximum topple at 90°, rather than at 180°, as in FIG. 5B. It may be seen that there are force maxima at slightly under 180° in the X axis direction and slightly later than 180° in the Y axis direction, both of about the same 15,000 newtons. The resultant force direction determines the direction of movement of the vehicle, within its own frame of reference.

It has been found that for a particular gyro operating at a particular speed, the distance of the gyro axis from the center of gravity of the machine is critical to obtaining maximum output force. In the explanation related to FIG. 2 this length was assumed to be from the center of gravity of the machine at the origin of the axes.

Figure 6A:
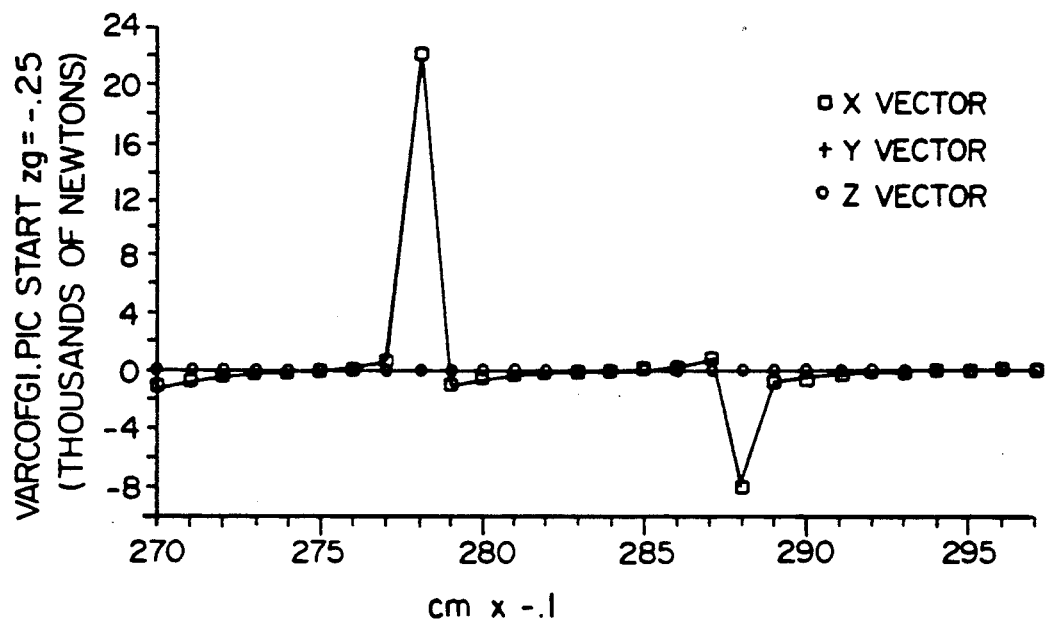
Figure 6B:
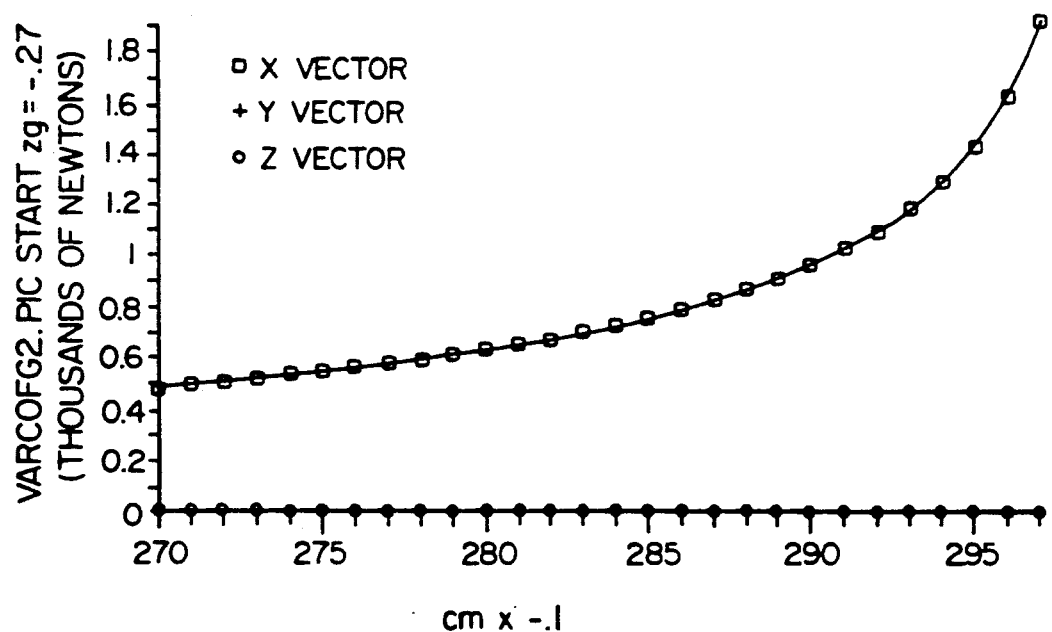

FIG. 6A is a computer generated graph of output force versus the length L to the axis A-B of the gyro from the center of gravity of the machine, for the embodiment described with reference to FIG. 6A, with an angle of topple of 0° and an arm length L=20 cm. FIG. 6B is an expanded graph of the transition to the high slope region of the curve, for an example in which L=30 cm. It may be seen that there is a major force peak in the X direction where the center of gravity is about 27.7 cm from the A-B axis, and a smaller force peak in the reverse direction where the center of gravity is about −28.8 cm from the A-B axis. Clearly the force of thrust can be reversed by making the supporting arms extendable and retractable, and the length L is critical to obtaining maximum force. Indeed, a motor controlled telescopic arm (eg. using a rack and pinion) changing the arm length of the axis A-B to the center of gravity of the machine from 27 to 29 cm will completely reverse the direction of thrust of the machine.

Actual tests on a laboratory prototype of the machine approaching the optimal arm length point evidenced the drawing of increasing power from the motor 20, which resulted in increased unidirectional force and resulting movement of the machine in a controlled direction, to the maximum capability of the motor.

The linear force in the three spacial directions (fr, fy, fz), the arm length (ARM) between the axis of rotation (A-8) of a gyro wheel and the center of gravity of the apparatus for various (a) shaft lengths (L) between the axis A-B and rotation axis (Y), (b) gyro wheel radii (rad), (c) gyro wheel weights (wt), (d) coordinate of the center of gravity along the Z axis relative to the rotational axis Y (zg), (e) toppling rotational rate in RPM (rpmt), (f) rotational rate of the platform support for the gyro about its own axis in RPM (RPMPLAT), and (g) rate of rotation of the gyro wheel about the Y axis (RPMROT)

can be calculated from the following computer program, expressed in the BASIC language, and starting from a initial angle in degrees (ang0):

```
i = wt * rad * rad / 2
vtoppl = K * rpmt: vplat = K * RPMPLAT:
        vrot = K * RPMROT
psi0 = R * ang0
M = i * vrot * vplat
kt = 1 / (3 * rpmt)
DO WHILE COUNT 30
FOR j = 0 to 179
t = kt * j
THETA = vtoppl * t
PSI = psi0 + vplat * t
ARM = L - zg * COS(THETA)
fx = M * COS(PSI) * COS(THETA) / ARM
fy = M * SIN(PSI) / ARM
fz = M * COS(PSI) * SIN(THETA) / ARM
TFX = TFX + fx: TFY = TFY + fy: TFZ = TFZ + fz
NEXT j
    COUNT = COUNT + 1
WRITE #1, zg, TFX / 180, TFY / 180, TFZ / 180
    zg - zg * 1000: zg = zg - 1: zg = zg / 1000
    XVECTOR = TFX: YVECTOR = TFY: ZVECTOR = TFZ
TFX = 0: TFY = 0: TFZ = 0: t = 0
    CLS
    IF QUESS = "N" THEN EXIT DO
PRINT "zg = "; zg; TAB(40); " x = ";
    XVECTOR / 180; TAB(62);COUNT
LOOP
PRINT "L=", L; "rad=", rad; "wt=", wt; "zg=", zg
PRINT
PRINT "rpmt=", rpmt; "RPMPLAT=", RPMPLAT;
    "RPMROT=", RPMROT;"ang0=",ang0
```

The graphs shown in FIGS. 5A-6B were drawn from the results of the above computer program.

From the above it may be seen that there are eight critical parameters involved in the operation of the present gyrostat propulsion system (GPS) invention. The proper optimizing of these parameters enables the GPS to produce efficient conversion of rotary motion and does this in its own frame of reference.

(1) The length of the arm (shown in FIG. 2 as the distance from the X axis to the A-B axis of the gyro) (e.g. along the Z axis) can be critical in relation to the center of gravity of the mechanism.

(2) Radius of the gyro wheel - This parameter is governed by a square law, i.e. doubling the radius (without an increase in the weight) enables the mechanism to produce four times the output force.

(3) Speed of rotation of the main axis. This is governed by a linear law. A 50% increase in speed enables a 50% increase in output force. Below a critical speed no force is produced. The direction of rotation governs the direction of motion.

(4) Speed of rotation of the platforms (e.g. 12 and 13, FIG. 3). The platform speed is related to the speed of the main axis in the geared embodiment of the invention but not in a stepper motor controlled embodiment. Varying the platform speed in relation to the speed of the main axis enables the mechanism to change the direction of thrust of the resultant output force.

(5) Rotational speed of the gyro wheel. This is governed by a linear law. Doubling the speed enables the GPS to produce double the output force. Below a critical speed no output force is produced. The direction of rotation governs the direction of motion.

(6) Weight of the gyro wheel. This is governed by a square law. Doubling the weight (without an increase in radius) enables the mechanism to produce four times the output force.

(7) Initial angle (the A-B axis in FIGS. 1, 2, 3 and 7). This angle can be set initially with a geared mechanism or changed at will in a stepper motor controlled embodiment. This angle governs the direction of motion of the GPS and the relative strength of the forces generated in the X, Y or Z planes.

(8) Center of gravity. Under certain circumstances this parameter can be critical. It acts as the fulcrum point for the conversion of the rotary gyro energy into linear output forces. It can be predetermined to an extent in the initial design, and can be altered by the placement of such components as the main axis turning motor or by the manipulation of weights. It interacts with parameter (1) (the length of the arm) noted above.

In the foregoing list of parameters and its preceding paragraph it is important to understand the meaning of the word "enables". What is meant is that given optimum conditions the GPS can produce the desired forces. For example doubling the speed of the gyro wheels will double the output force - but only if the motor turning the main axis can supply the necessary energy to the system. If it cannot then the motor will stall and mechanism will come to an abrupt stop. This also means that under certain circumstances, motion can be produced by improving the efficiency of the design. Calling for more input energy will also cause the GPS to stall if the motor cannot supply sufficient energy.

It should be noted that the larger and heavier the gyros the more efficient is the ratio of pay-load to total weight and the more efficient the conversion of rotary motion (energy) in linear motion.

Figure 7:
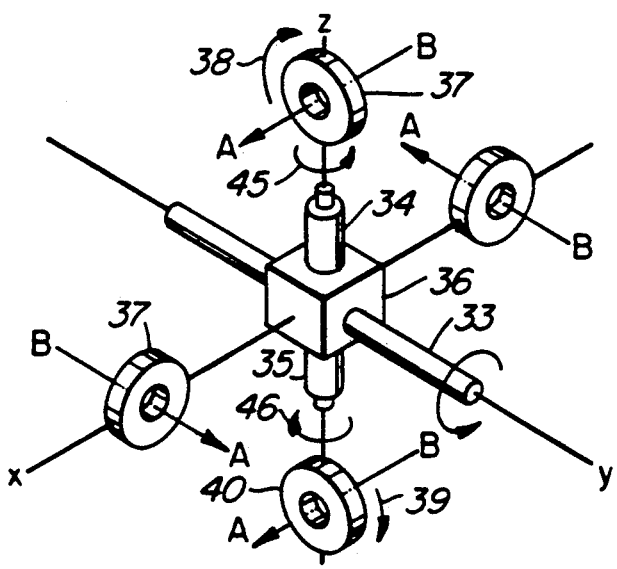

FIG. 7 shows a schematic of another embodiment of the invention. A shaft 33 has a pair of oppositely disposed stepping motors 34 and 35 mounted with their output shafts orthogonally outward pointing from shaft 33. The stepping motors are mounted on a support 36 clamped or otherwise immovably fixed to shaft 33. Supporting mounts of the gyros (represented by their rotational axes A-B) are fixed to the shafts of the stepping motors.

Shown at top dead center is a rotating gyro wheel 37, rotating in the direction of the arrow 38. At bottom dead center is a rotating gyro wheel 39, rotating in the opposite direction 40. The axes A-B of both gyro wheels 38 and 39 point in the same direction.

The shaft 33 rotates about its axis Y, taking the stepping motors and gyros with it. The stepping motors orient the axes A-B of the gyros in the directions 45 and 46 shown, the heads of the arrows representing the direction of rotation of the axes A-B of the gyro wheels as they rotate around the axis Y. The directions of the axes of the gyro wheels are directly analagous to the directions in FIG. 2, and reference is made to the explanation concerning FIG. 2 for an explanation of operation.

However in the embodiment of FIG. 7 since stepping motors are used, the orientation of the axes A-B can be made quickly and with precision to the most optimum. For example the directions of axes A-B can be left to be parallel to the axis Y until just prior to the time that maximum precessional force is to be obtained, at which time they can be quickly rotated so that the axes A-B are orthoqonal to the axis Y. After the precessional force in the desired X direction has been obtained, the axes A-B can be rotated quickly by the stepping motors to positions parallel to the Y axis to avoid causing cancelling or creation of precessional force in an undesired direction. In this way complete control over the application of precessional force can be obtained.

In the embodiment of FIG. 7, it may be seen that an additional pair of oppositely disposed stepping motor orientation controlled gyros can be located in the same plane as the first pair, but located 90° from the first pair, forming a cross when looking into the Y axis. These additional gyros, creating linear force phase shifted 90° from the first pair, will tend to fill in the low or zero force intervals evident in FIG. 4.

Variations of the above described invention can achieve similar or improved results over the embodiment described. For example the motor 20 could be a stepping motor, which could vary the toppling speed of the gyros as they pass through different portions of their cycles. For example the gyro could be moved quicker through portions of the cycle where no precessional force is created, and slower through those portions in which the significant precessional force is created.

Figure 1:
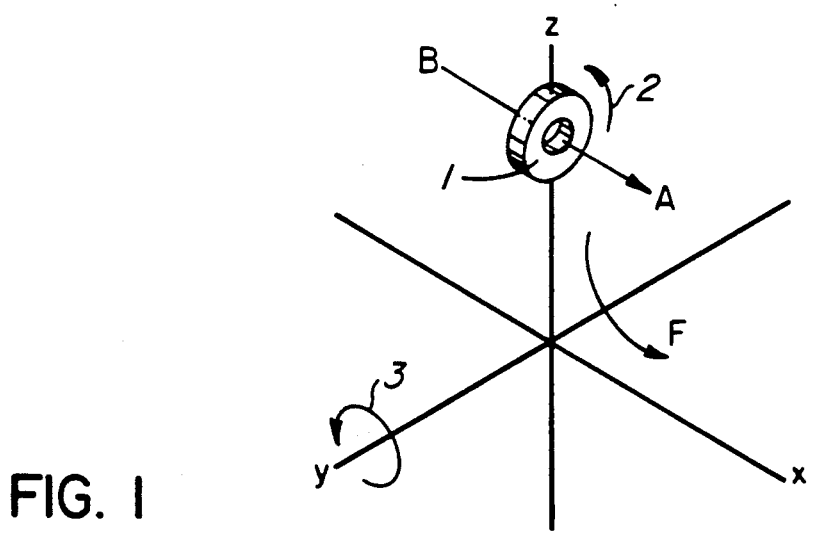

The invention has been shown to work with a single gyro, satisfying the principle of the invention as described with respect to FIG. 1. A counterweight substituting for the second gyro is preferred to be used in order to stabilize the machine.

Figure 8:
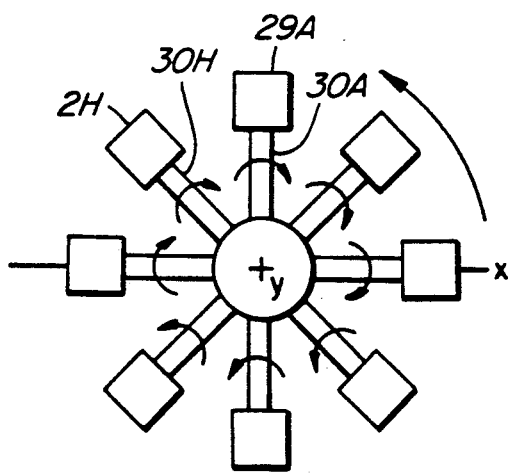

Rather than having only two oppositely disposed gyros, pairs of gyros can be located around a central axis as shown in FIG. 8 in a star configuration. The axis Y is perpendicular to the paper, and gyros 29A-29H are mounted for rotation about the axis Y on supporting mechanisms such as axels 30A-30H which themselves rotate in the directions of the arrows shown (conforming to operation as described above with respect to FIGS. 1, 2 and 3). Each of the gyros 29A-29H are themselves rotated so as to provide maximum precessional force along the X axis.

Indeed, with appropriate structures, the force can be increased further by stacking gyros vertically, and/or by stacking additional similar mechanisms along the X or Y axes.

The electromagnetic form of gyros shown are merely illustrative of the kind used in a laboratory prototype. However it is contemplated that other forms of gyros such as optical energy gyros could be used for some applications. The motor 20 could be a gasoline or other motor capable of providing rotation to the differential 16 or shaft 17 or 33. Indeed any other form of motor could be used, or indeed any mechanism which could cause toppling of the gyros over the desired angular intervals with the orientation shown.

The frame illustrated herein is of course merely a structure for supporting the mechanism, and in a commercial version of the invention the structural mounting would of course be optimized for its application. It is also contemplated that the rotating mechanisms should be contained within a protective housing in order to avoid harm to any surrounding structures or persons should an accidental dislodgement of parts of the structure occur.

A person understanding this invention may now conceive of alternative structures and embodiments or variations of the above. All which fall within the scope of the claims appended hereto are considered to be part of the present invention.

I claim:

1. A thrust producing apparatus comprising a gyrostat having a gyrostat wheel, means for supporting the gyrostat, means for toppling the gyrostat creating precessional force in a predetermined direction against the supporting means, and means for rotating the gyrostat into an orientation whereby it can again be toppled while avoiding the creation of precessional force in a direction opposite to said predetermined direction.

2. A thrust producing apparatus as defined in claim 1, in which the rotating means is comprised of means for rotating the supporting means around a principal axis while rotating the axis of rotation of the gyrostat wheel about the axis of the supporting means to a position perpendicular to said principal axis during creation of said precessional force in said predetermined direction, and to a position parallel to said principal axis otherwise.

3. A thrust producing apparatus as defined in claim-1, in which the rotating means is comprised of a means for rotating the supporting means about a principal axis while rotating the axis of rotation of the gyrostat wheel through 360°, in which the axis of rotation of the gyrostat is parallel to said predetermined direction while said supporting means is about 90° from the axis of said predetermined direction, parallel to said predetermined direction while said supporting means is about 270° from the axis of said predetermined direction and with the axis of rotation of the gyrostat wheel in the same direction as its orientation taken when the supporting means is about 90° from the axis of said predetermined direction, perpendicular to said predetermined direction while the supporting means is about on said axis of said predetermined direction but at a position behind said principal axis with respect to said predetermined direction, and perpendicular to said predetermined direction but reversed in rotational direction from the position behind the principal axis while the supporting means is about on said axis of said predetermined direction but at a position ahead of said principal axis with respect to said predetermined direction.

4. A thrust producing apparatus as defined in claim 1, in which the rotating means is comprised of a means for rotating the supporting means about a principal axis while rotating the axis of rotation of the gyrostat wheel through 360°, in which the axis of rotation of the gyrostat is parallel to said predetermined direction while said supporting means is about 90° from the axis of said predetermined direction, parallel to said predetermined direction while said supporting means is about 270° from the axis of said predetermined direction and with the axis of rotation of the gyrostat wheel in the same direction as its orientation taken when the supporting means is about 90° from the axis of said predetermined direction, perpendicular to said predetermined direction while the supporting means is about on said axis of said predetermined direction but at a position behind said principal axis with respect to said predetermined direction, and perpendicular to said predetermined direction but reversed in rotational direction from the position behind the principal axis while the supporting means is about on said axis of said predetermined direction but at a position ahead of said principal axis with respect to said predetermined direction.

5. A first and a second thrust producing apparatus each as defined in claim 1, 2, 3 or 4 in which the gyrostat of the second apparatus is located at a position directly opposite the first thrust producing apparatus with respect to the principal axis, and having a gyrostat supporting means coupled to the first gyrostat supporting means through said principal axis.

6. A first and a second thrust producing apparatus each as defined in claim 1, 2, 3 or 4 in which the gyrostat of the second apparatus is located at a position directly opposite the first thrust producing apparatus with respect to the principal axis, and having a gyrostat supporting means coupled to the first gyrostat supporting means through said principal axis, the lengths of supporting means being equal.

7. A first and a second thrust producing apparatus each as defined in claim 1, 2, 3 or 4 in which the gyrostat of the second apparatus is located at a position directly opposite the first thrust producing apparatus with respect to the principal axis, and having a gyrostat supporting means coupled to the first gyrostat supporting means through said principal axis, the distances of the axis of rotation of each of the gyrostat wheels from the principal axis being selected to produce a predetermined thrust.

8. A plurality of thrust producing apparatus each as defined in claim 1, 2, 3 or 4, in which gangs of said thrust producing apparatus are coupled through the same principal axis.

9. A plurality of thrust producing apparatus including a first and a second thrust producing apparatus as defined in claim 1, 2, 3 or 4 in which the gyrostat of the second apparatus is located at a position directly opposite the first thrust producing apparatus with respect to the principal axis, and having a gyrostat supporting means coupled to the first gyrostat supporting means through said principal axis, in which gangs of said thrust producing apparatus are coupled through the same principal axis.

10. A plurality of thrust producing apparatus including a first and a second thrust producing apparatus as defined in claim 1, 2, 3 or 4 in which the gyrostat of the second apparatus is located at a position directly opposite the first thrust producing apparatus with respect to the principal axis, and having a gyrostat supporting means coupled to the first gyrostat supporting means through said principal axis, the distances of the axis of rotation of each of the gyrostat wheels from the principal axis being selected to produce predetermined thrust, in which gangs of said thrust producing apparatus are coupled through the same principal axis.

11. A thrust producing apparatus as defined in claim 2, 3 or 4, in which the means for topping and the means for rotation is comprised of a differential gear mechanism rotated about said principal axis, a pair of rods extending in opposite directions from said mechanism 90° from the principal axis and rotating by said mechanism in opposite directions, and means for fixing the axes of rotation of the gyrostat wheels to said rods.

12. A thrust producing apparatus as defined in claim 2, 3 or 4, in which the means for toppling and the means for rotation are comprised of a differential gear mechanism rotated about said principal axis, a pair of rods extending in opposite directions from said mechanism 90° from the principal axis and rotating by said mechanism in opposite directions, and means for fixing the axes of rotation of the gyrostat wheels to said rods.

13. A thrust producing apparatus as defined in claim 2, 3 or 4, in which the means for toppling and the means for rotation are comprised of a differential gear mechanism rotated about said principal axis, a pair of rods extending in opposite directions from said mechanism 90° from the principal axis and rotating by said mechanism in opposite directions, means for fixing the axes of rotation of the gyrostat wheels to said rods, and a motor coupled to the differential gear mechanism for rotating said mechanism, and thereby rotating said rods in opposite directions.

14. A thrust producing apparatus as defined in claim 2, 3 or 4, in which the means for toppling and the means for rotation are comprised of a differential gear mechanism rotated about said principal axis, a pair of rods extending in opposite directions from said mechanism 90° from the principal axis and rotating by said mechanism in opposite directions, the mechanism being adapted to rotate each of the rods through 360° about their own axes while being rotated themselves 360° about the principal axis, and means for fixing the axes of rotation of the gyrostat wheels to said rods.

15. A thrust producing apparatus as defined in claim 2, 3 or 4, in which the means for toppling and the means for rotation are comprised of a differential gear mechanism rotated about said principal axis, a pair of rods extending in opposite directions from said mechanism 90° from the principal axis and rotating by said mechanism in opposite directions, the mechanism being adapted to rotate each of the rods through 360° about their own axes while being rotated themselves 360° about the principal axis, means for fixing the axes of rotation of the gyrostat wheels to said rods, said supporting means being further supported by a supporting rod extending along the principal axis into said mechanism, for rotating said mechanism, and a frame for receiving said force coupled via bearings to said supporting rod.

16. A thrust producing apparatus comprising a gyrostat having a gyrostat wheel for rotation about a rotational axis, a principal axis for the apparatus, means for supporting the gyrostat a distance perpendicular to the axis whereby the plane of the rotational axis is tangent to a circle centered on the principal axis, means for rotating the gyrostat about the principal axis while rotating the rotational axis about 360° in said plane while rotating the support 360° about the principal axis, whereby precessional thrust is created in a direction orthogonal to the principal axis.

17. A thrust producing apparatus as defined in claim 16 in which the means for rotating the rotational axis is a stepping motor.

18. A thrust producing apparatus as defined in claim 16 in which the means for supporting is comprised of a rod along the principal axis and an arm for supporting the gyrostat extending perpendicular to the rod fixed to the rod for rotation about the axis of the rod, and further including means for rotating the rod about its axis.

19. Thrust producing apparatus as defined in claim 16, 17 or 18 in which the rotating means is adapted to rotate said rotational axis so that it is at least approximately orthogonal to the principal axis when located between a small angle less than 90° and 90° to said directional of precessional thrust and when located between about 270° and a small angle greater than 270° to said direction of precessional thrust but with the axis of rotation reversed 180°.

20. Thrust producing apparatus as defined in claim 16, 17 or 18 in which the rotating means is adapted to rotate said rotational axis so that it is at least approximately orthogonal to the principal axis when located between a small angle less than 90° and 90° to said directional of precessional thrust and when located between about 270° and a small angle greater than 270° to said direction of precessional thrust but with the axis of rotation reversed about 180°, and further comprising a second similar apparatus disposed in a position directly opposite to the first thrust producing apparatus and similarly supported on the same principal axis.

21. Thrust producing apparatus as defined in claim 16, 17 or 18 in which the rotating means is adapted to rotate said rotational axis so that it is at least approximately orthoqonal to the principal axis when located between a small angle less than 90° and 90° to said directional of precessional thrust and when located between about 270° and a small angle greater than 270° to said direction of precessional thrust but with the axis of rotation reversed about 180°, and further comprising a second apparatus disposed in a position directly opposite to the first thrust producing apparatus and similarly supported on the same principal axis, the distances of the rotational axes of the gyrostats from the principal axis being predetermined to obtain predetermined thrust.

22. Thrust producing apparatus as defined in claim 16, 17 or 18 in which the rotating means is adapted to rotate said rotational axis so that it is at least approximately orthogonal to the principal axis when located between a small angle less than 90° and 90° to said directional of precessional thrust and when located between about 270° and a small angle greater than 270° to said direction of precessional thrust but with the axis of rotation reversed about 180°, and further comprising a second similar apparatus disposed in a position directly opposite to the first thrust producing apparatus and similarly supported on the same principal axis, and means for varying the length of the gyrostat supporting means for selectably varying the distances of the rotational axes of the gyrostats from the principal axis whereby the direction of output force can be reversed depending on said distances.

23. Thrust producing apparatus as defined in claim 16, 17 or 18 in which the rotating means is adapted to rotate said rotational axis so that it is at least approximately orthoqonal to the principal axis over when located between a small angle less than 90° and 90° to said directional of precessional thrust and when located between about 270° and a small angle greater than 270° to said direction of precessional thrust but with the axis of rotation reversed about 180°, and further comprising a second similar apparatus disposed in a position directly opposite to the first thrust producing apparatus and similarly supported on the same principal axis, and means for varying the length of the gyrostat supporting means for selectably varying the distances of the rotational axes of the gyrostats from the principal axis.

* * * * *